United States Patent [19]

Marz

[11] 4,218,861
[45] Aug. 26, 1980

[54] APPARATUS FOR CLOSING AND SEALING CONTAINERS

[75] Inventor: Horst F. Marz, Otterburn Park, Canada

[73] Assignee: Canadian Industries Limited, West Montreal, Canada

[21] Appl. No.: 927,979

[22] Filed: Jul. 26, 1978

[30] Foreign Application Priority Data

Aug. 10, 1977 [CA] Canada .................................. 284654

[51] Int. Cl.³ ............................................. B65B 51/08
[52] U.S. Cl. ...................................... 53/138 A; 53/550
[58] Field of Search ...................... 53/138 A, 550, 551, 53/552, 583, 576; 29/243.56, 243.57

[56] References Cited

U.S. PATENT DOCUMENTS

| | | | |
|---|---|---|---|
| 3,159,955 | 12/1964 | Thurlings | 53/551 |
| 3,214,883 | 11/1965 | Omori | 53/138 A X |
| 3,587,204 | 6/1971 | George | 53/138 A |
| 3,696,179 | 10/1972 | Jacobs | 53/552 X |

FOREIGN PATENT DOCUMENTS

| | | | |
|---|---|---|---|
| 710061 | 5/1965 | Canada | 53/552 |
| 393177 | 10/1965 | Switzerland | 53/138 A |

*Primary Examiner*—John Sipos
*Attorney, Agent, or Firm*—Donald G. Ballantyne

[57] ABSTRACT

An apparatus is described for handling a continuous, stuffed, flexible casing and especially stuffed with explosives material. The apparatus includes pairs of split necking plates on either side of a casing path adapted for opposed reciprocal movement for engaging the casing in the path and necking the casing. The necking plates are mounted by a parallelogram linkage suspended from an overhead frame, and linkage means are provided for simultaneously moving the necking plates through said parallelogram linkage to neck the casing. Each pair of necking plates is adapted to move apart in a direction parallel to the axis of the path of the casing such that when the casing is necked by the necking plates, the neck so formed on the casing can be elongated by moving the plates apart. Magazine means are provided for advancing clips overhead of the casing, and a reciprocating plunger removes the clips from the magazine and arranges them on the neck portion of the casing between the necking plates as they are split apart. Die means are pivoted from the overhead frame and adapted for movement to and from a position between the split-apart necking plates below and adjacent the necked portion of the casing for receiving and forming the clips. Cutting means are pivotally mounted to the overhead frame for movement between the split-apart necking plates to cut the casing in the vicinity of the clips.

4 Claims, 10 Drawing Figures

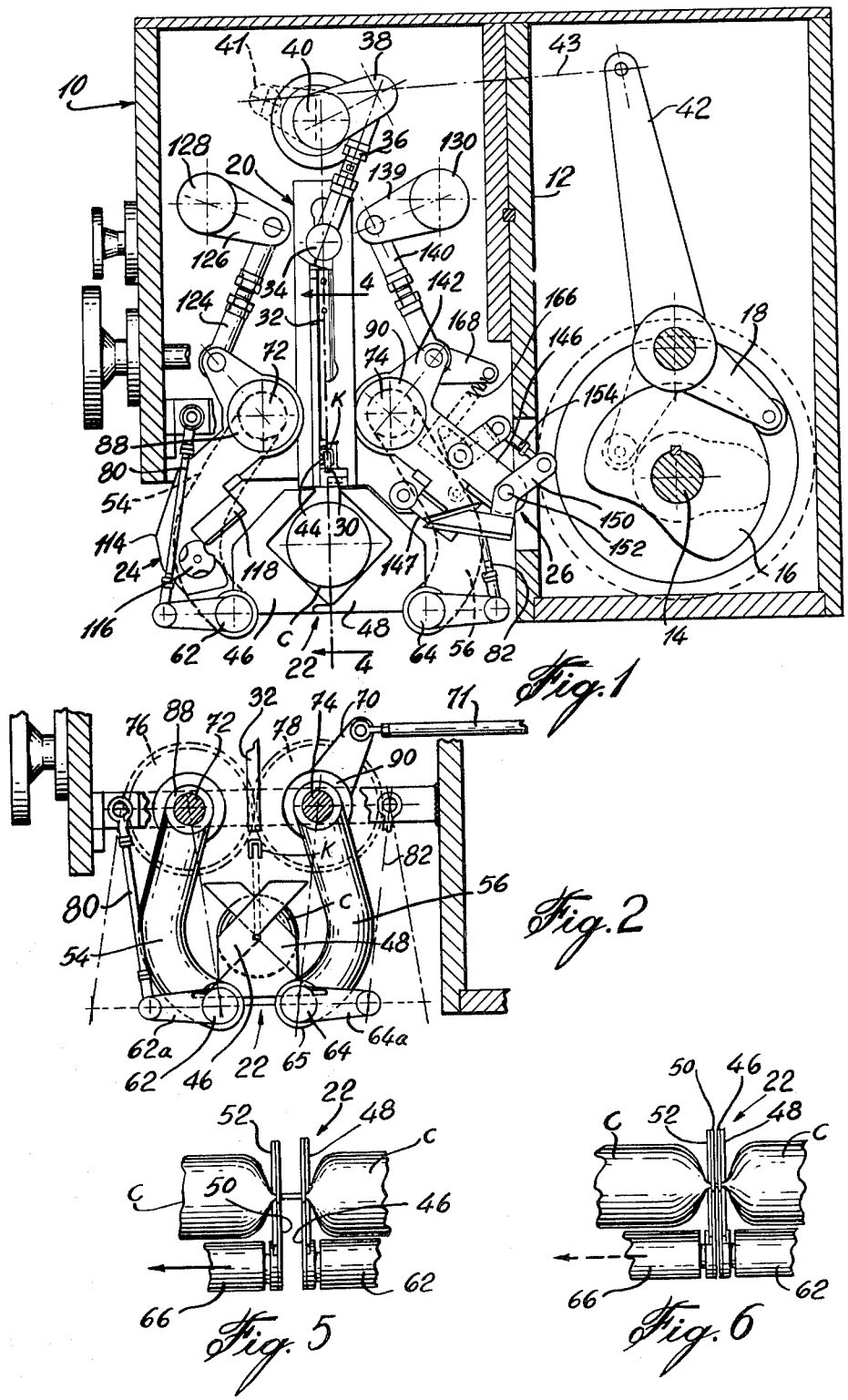

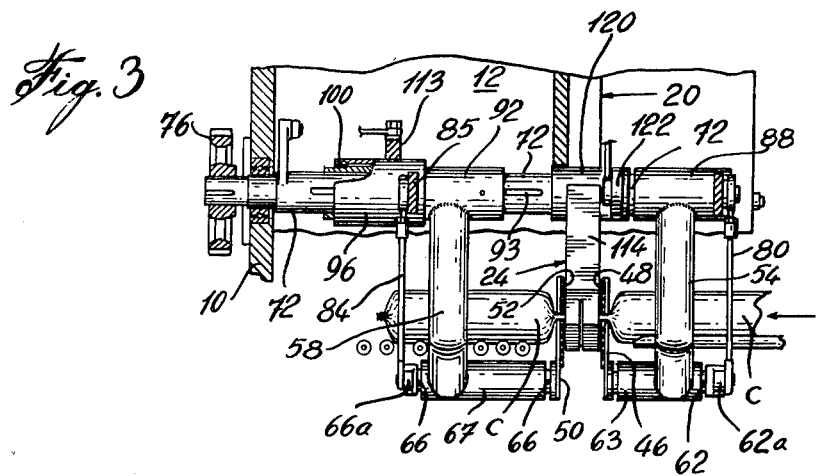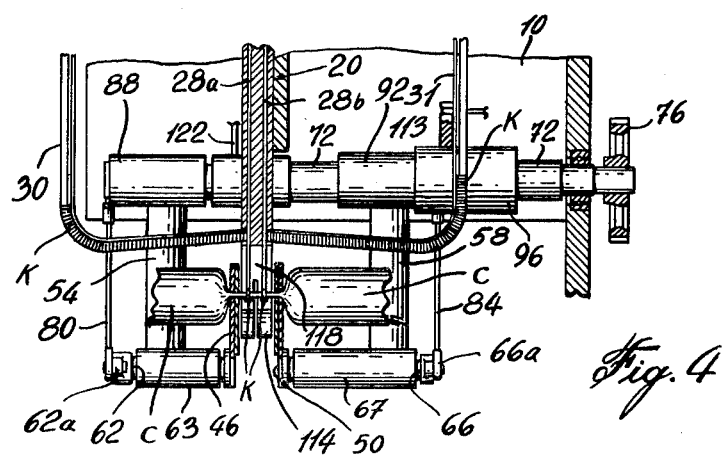

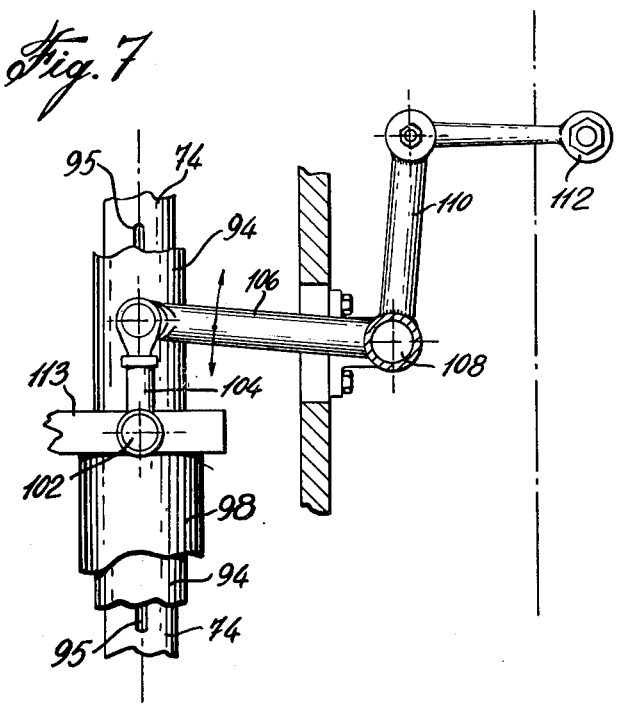
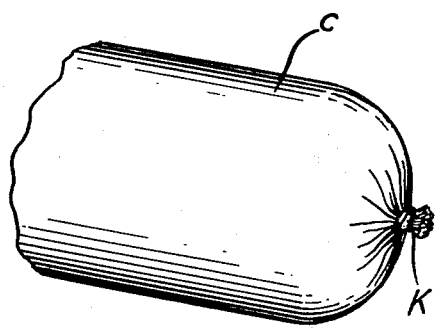

APPARATUS FOR CLOSING AND SEALING CONTAINERS

BACKGROUND OF THE INVENTION

1. Field of the Invention

The present invention relates to an apparatus for closing and sealing containers, and in particular, containers such as bags and casings, and clipping the ends thereof with a staple-like closure.

2. Description of the Prior Art

There has been much development in the food packing industry and particularly the sausage industry wherein sausage meat is stuffed in a continuous casing. Such methods include separating the stuffed continuous casing into predetermined lengths, and cutting, sealing and clipping the ends of the individual sausage chubs.

U.S. Pat. Nos. 3,377,692, Tipper, Apr. 16, 1968, and 3,543,378, Klenz, Dec. 1, 1970, describe typical clipping apparatuses for sealing and clipping the ends of sausage casings by first necking the continuous elongated filled casings at spaced points along their length to form chubs. One of the developments in the above-mentioned Tipper patent is the use of gathering plates or jaws to neck the casing at spaced points and then apply clips to the casing between the gathering plates. It is suggested in the patent that double clips can be provided between the gathering plates and that the casing can be cut therebetween. However, if enough space is left between the gathering plates to allow for dies for a double clip and for cutting apparatus, a mini-chub would be formed between the two sets of gathering plates. It is further found to be a disadvantage to have gathering plates moving in tracks on a fixed frame since the material being filled can collect in the tracks, creating frequent maintenance problems.

SUMMARY OF THE INVENTION

It is an aim of the present invention to provide a fully mechanized apparatus for necking the casing, for elongating the neck, clipping a pair of clips at the neck, and cutting the casing between the clips. It is a further aim of the present invention to provide an apparatus which would minimize areas susceptible of collecting the filling material and thereby reducing the time required for cleaning and maintenance.

It is a further aim of the present invention to provide an apparatus for safely handling casings filled with explosive material.

An apparatus in accordance with the present invention includes pairs of split necking plates on either side of a casing path adapted for opposed reciprocal movement for engaging a casing in the path and necking the casing, the necking plates each being mounted by a parallelogram linkage suspended from an overhead frame, linkage means for simultaneously moving said necking plates through said parallelogram linkage, means for moving one of each pair of necking plates in a direction parallel to the axis of the path of the casing such that when the casing is necked by the necking plates, the neck so formed on the casing can be elongated by moving said plates, magazine means for advancing at least a clip overhead of said casing, a reciprocating plunger for removing a clip from said magazine means and arranging it on said neck portion of said casing between the necking plates as they are split apart, die means pivoted from said overhead frame and adapted for movement to and from a position between the split-apart necking plates below and adjacent the neck portion of the casing for receiving and forming the clip, and cutting means for moving between said split-apart necking plates and cutting the casing in the vicinity of said clip.

None of the frame is found under the path of the casing. All of the necking, clipping and cutting assemblies are pivoted from overhead of the path and move into the path of the casing only when required so that little or no areas of the frame are susceptible to accumulating the material being filled in the casing.

In a more specific embodiment in accordance with the present invention, there is included a frame, means defining a path for the casing, two pairs of necking jaws with one pair on either side of the path in opposed relationship, each pair of jaws mounted for pivoting movement to the lower end of a bell crank member which in turn is pivotally mounted to the frame, means for controlling the pivoting movement of said bell crank member, a link arm pivotally connected at one end to the frame end at the other end to an extension of the necking jaws so as to maintain a parallelogram linkage between said frame, said bell crank member, said link and said extension so that the jaws reciprocate along linear axes towards and away from each other, means for separating the pairs of jaws, means for pivotally moving a die towards and away from said path between the separated jaws, magazine and plunger means for lowering a pair of clips to the die at said path, and forming said clips on said die, and cutting means for cutting through said path between the clips on the die.

A method in accordance with the present invention includes the steps of first filling a continuous elongated cylindrical flexible casing with material to be packed in the casing, necking the casing at a predetermined interval, increasing the area being necked, applying clips to the neck portion and forming the clips about the neck portion and cutting the casing at the neck portion in the vicinity of the clips. The apparatus provided in accordance with the invention permits operation with a positive, clean voiding action which eliminates the formation of any mini-chub between the double clips. Thus the contamination of the apparatus by any product within any mini-chub when the packages are separated, is avoided. This is particularly critical in explosive packaging where all such contamination must be avoided. The use of the disclosed parallelogram linkage permits a substantially straight-line motion of the film necking plates without employing any guide rails or other frictionally hazardous guide means. This linkage also allows for a gathering action of the necking plates against the film casing material at an angle in excess of about 60°, thus eliminating cut or damaged film and spilled product. The cam actuated clipping action provides positive controlled clip closure resulting in fewer improperly cinched clips. This cam actuation also reduces excessive impact velocity during clipping and hence reduces the impact hazard when packaging sensitive material such as explosives.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a front elevation of the apparatus in accordance with an embodiment of the present invention, with a portion of the housing removed, taken in a plane at right angles to the axis of the path of the casing at the infeed end thereof;

FIG. 2 is a fragmentary elevation in the same direction as FIG. 1, showing a detail of the apparatus in FIG. 1 in a different operative position;

FIG. 3 is a fragmentary side elevation of the apparatus in accordance with the embodiment of FIG. 1;

FIG. 4 is a vertical cross-section taken along the line 4—4 of FIG. 1, illustrating the details shown in FIG. 3 but from a reversed angle;

FIG. 5, which is on the same sheet as FIG. 1, is an enlarged fragmentary view of a detail of FIG. 3;

FIG. 6, which is on the same sheet as FIG. 1, is an enlarged fragmentary elevation similar to FIG. 5, showing the detail in a different operative position;

FIG. 7 is a fragmentary top plan of a detail of the apparatus;

FIG. 10, which is on the same sheet as FIG. 7, is a fragmentary perspective view of a finished casing.

DESCRIPTION OF THE PREFERRED EMBODIMENTS

Figure 8:
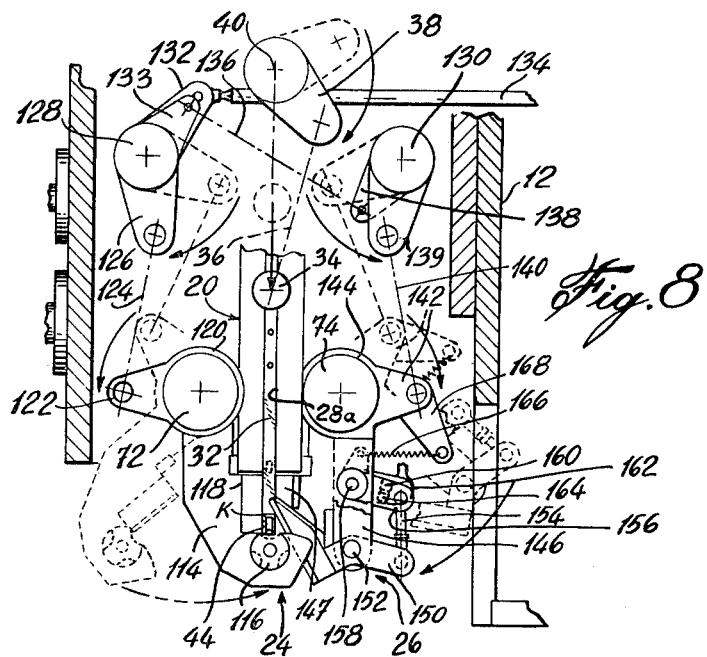
FIG. 8 is a front elevation, partly schematic, taken in the same direction as FIG. 1.

Referring now to FIG. 1, there is shown a housing 10 with a partition 12 separating the housing. A cam shaft 14 mounting a series of cams 16 and which activate a plurality of cam followers 18, is found in one compartment while the casing handling apparatus is in the other compartment. In the latter compartment, there is a magazine and plunger assembly 20, a necking assembly 22, a die assembly 24 for cooperating with the magazine and plunger assembly 20, and a cutting assembly 26 for cutting the necked casing C.

The magazine and plunger assembly 20 includes an upstanding double track member 28, including a pair of simultaneously acting plungers 32 sliding in the individual parallel tracks 28a and 28b. The tracks 28a and 28b can be seen more clearly in FIGS. 4 and 8. A pair of clip magazines 30 and 31, as shown in FIG. 4, feed U-shaped clips K to the bottom of the track member 28. The magazines 30 and 31 are conventional, and the clips K are fed by gravity. Each plunger 32 is connected to a stub shaft 34 which in turn pivotally mounts an adjustable link 36 pivotally connected at the other end to crank arm 38. Crank arm 38 is fixed to a shaft 40 which in turn mounts a crank arm 41 connected by a link 43 to the cam follower arm 42.

The necking assembly 22 includes a pair of split flat jaw plates 46 and 50 having a 90° V cut-out portion and a pair of identical jaw plates 48 and 52 facing plates 46 and 50. Each jaw plate 46, 50, 48 and 52, is mounted to individual parallelogram linkage assemblies. These assemblies include, as shown in FIG. 2, for instance, with reference to jaw plate 46, a curved arm 54 fixed to one end to sleeve 88 fixed to shaft 72 which in turn is journaled on the frame of the housing 10. At the other end of the arm 54, there is mounted a sleeve 63 in which shaft 62 is journaled. The shaft 62 mounts a lever 62a, and as shown in FIGS. 3 and 4, mounts the split jaw plate 46. Lever 62a is pivotally connected to a link 80 which is pivoted at its other end to the frame of the housing 10. As shown in FIGS. 2, 3 and 4, the parallelogram is formed between a portion of the frame 10, the link 80, the lever 62a, and the arm 54.

Similarly, the opposed arm 56 mounts a sleeve 65 in which shaft 64 is journaled. The shaft 64 mounts the split jaw plate 48 and includes a fixed lever 64a pivotally connected to a link 82 pivotally connected to the frame 10. The link 82 connected to the lever 64a and to the frame as shown in FIG. 2, ensures the parallel movement of the jaw 48 mounted to the shaft 64. Arm 56 is fixed to a sleeve 90 connected to the shaft 74. A lever 70 which is also fixed to the shaft 74, is connected to a cam arm and follower by means of a link 71. Accordingly, the jaw plates 46 and 48 can move towards each other in a complete parallel reciprocating movement.

As shown in FIGS. 2, 3 and 4, the ends of shafts 72 and 74 mount meshing gears 76 and 78. The gears 76 and 78 transfer the rotational movement of shaft 74 to shaft 72 which is actuated by the link 71 in response to the respective cam.

Referring to FIGS. 3 and 4, the other split jaw plates 50 and 52 are illustrated. These jaw plates can also be seen in FIGS. 5, 6 and 7 which show the two positions of the jaws in forming the neck on the casing C. The split jaw plate 50, for instance, is mounted to a shaft 66 which is journaled in a sleeve 67. The sleeve 67 is fixed to an arm 58 which is of a similar shape to arm 54. Arm 58 is fixed to a concentric cylindrical sleeve 92 slidably mounted on the shaft 72. The sleeve 92 is adapted to slide longitudinally of the shaft and is restricted from relative rotational movement on the shaft 72 by means of a key and keyway 93. A further cylindrical sleeve 96 is mounted for relative rotational movement on the sleeve 92 by means of bearings 100, but is prevented from longitudinal sliding movement relative to the sleeve 92. The arm 58 forms a parallelogram linkage with link 84 pivotally mounted to an ear 85 extending from the sleeve 96. The other end of link 84 is pivotally connected to a lever 66a fixed to the shaft 66. The opposed split jaw 52 is not shown but is identical to the construction mounting the split jaw 50 and is on the same side as the split jaw 48.

Reference is now made to FIG. 7 which illustrates shaft 74 mounting the slidable sleeve 94 and the key and keyway 95. The outer sleeve 98 includes a pedestal 102 to which a link 104 is pivotally connected. At the other end of the link 104, there is pivotally connected one end of crank arm 106 pivoted at 108 and including a right angle crank arm 110 which is actuated by a cam arm 112. A coupling member 113 extends between the sleeve 98 and sleeve 96 in order to move the sleeves 96 and 98 along with sleeves 92 and 94 simultaneously in response to a movement of crank arm 110.

The die assembly 24 includes an arm 114 and a rotary three-faced die 116 inset into the arm 114, as shown in FIGS. 1 and 8. The die can be set for three different sizes of clips K as will be described later. Immediately adjacent the rotary die 116 on the arm 114 is a track section 118. When the arm 114 is in an operative position as shown in FIG. 8, the track segment 118 is directly aligned with the tracks 28a and 28b such that when the plungers 32 pick up clips K from the magazines 30 and 31 respectively, they proceed down their linear path along the segments 118 and 147.

The arm 114 is fixed to a cylindrical sleeve 120 which is rotatable on the shaft 72 and which in turn includes a crank arm 122. A link member 124 is pivotally connected to the crank arm 122 at one end thereof and to the crank arm 126 at the other end. Crank arm 126 is fixed to shaft 128 which in turn mounts the crank 132.

Arm 132 is connected to a cam follower arm (not shown) by means of link 134. An identical shaft 130 is located parallel to shaft 128. A crank arm 138 is mounted to shaft 130 and is linked to crank arm 133 on shaft 128 by a link member 136. Crank member 139 is also fixed to shaft 130.

The cutting assembly 26 includes a knife arm 146 mounted to a concentric sleeve 144 rotatable on the shaft 74. The sleeve 144 includes a crank arm 142 which is connected by means of the link member 140 to the crank arm 139. The cutting arm 146 mounts at one end thereof a bracket 150 to which is fixed a knife blade 148. The bracket 150 is pivotally connected to the arm 146 at 152. A link member 154 is pivotally connected at one end to bracket 150 and at the other end thereof to a bell crank 156. The bell crank 156 is pivoted to the knife arm 146 at 158. A projection 168 is fixed at an angle to the knife arm 146 and mounts a tension spring 166 connected at one end thereof to an arm on the bell crank member 156. A lever 162 is pivoted to the frame and is pivotally connected to a link member 170 which is turn is connected to a bell crank member 172 pivoted at 174 in the cam compartment. The bell crank member 172 is actuated by a link 175 connected to a cam follower 176.

Figure 9:
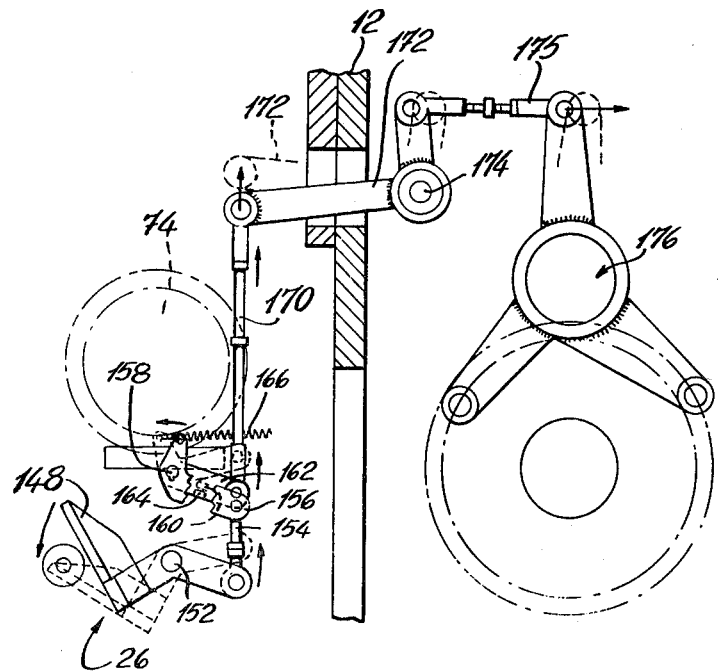
FIG. 9 is an enlarged schematic view of a detail of the apparatus shown in FIG. 8.

The lever 162 includes an abutment 164 while the bell crank member 156 has a mating abutment 160. In a normal position as shown in FIG. 1, the bell crank member 156 is urged clockwise by the spring 166, thus retaining the knife in an upward position, as shown in full lines in FIG. 1 or FIG. 9. When the knife arm 146 assumes the position of FIG. 1, the crank arm 156 is disassociated completely from the lever 162. It is only when the knife arm 146 is in a downward operative position that the crank arm assumes a position represented in FIG. 8 and FIG. 9, ready to be actuated by the abutment 164 on lever 162.

In operation, a casing C proceeds along the casing path after having been packed with a gel-like powder, such as an explosive material. All of the moving parts are initially in the position shown in FIG. 1. As can be seen from FIG. 1, there is no frame member which passes underneath the path of the casing C, but rather the only parts under the path are the ends of the jaw plates of jaw assembly 22. Since these necking jaw plates do not slide in any fixed tracks but rather travel in midair suspended from the parallelogram linkages, there is little or no susceptibility to collect falling filling material which, in the case of explosive material, could be dangerous if in fact there were areas of friction caused by moving parts in fixed tracks below the path of the casing C.

As the casing C advances to a predetermined position, the cam shaft 14 which is rotating continuously causes the link member 71 to move towards the right to FIG. 2, thereby causing the shafts 72 and 74 to rotate by means of gears 76 and 78 to move all of the arms 54, 56, 58 and 60 inwardly towards each other. Thus, the split jaw members 46, 48, 50 and 52, move towards each other into the closed position shown in FIG. 2. As the jaws 46, 48, 50 and 52 meet, they neck the casing as shown in FIG. 6. Simultaneously (as shown in FIG. 7), the cam follower 112 moves the bell crank 106 thereby sliding the couple 113 connected to the sleeves 96 and 98, thus sleeves 92 and 94 forcing arms 58 and 60 to move towards the open position shown in FIGS. 3, 4 and 5, thereby moving the split jaw plates 50 and 52 away from plates 46 and 48. This action, as shown in FIG. 5, causes the jaws to "milk" the material in the casing C thereby elongating the length of the neck portion as shown in FIG. 5 and in FIGS. 3 and 4.

As soon as the split jaws are open as shown in FIG. 5, a link 134 causes the shafts 128 and 130 to rotate by the intermediary of crank arms 132 and 138, thereby moving the die arm 114 into the position shown in FIG. 8 as well as the cutting arm 146 into the position shown in FIG. 8, such that the track segments 118 and 147 are aligned with the tracks 28a and 28b. The bell crank 156 will now be in a position susceptible to being actuated by lever 162.

Simultaneously, the cam follower arm 42 moves the crank arm 38 clockwise through the intermediary of crank arm 41 and shaft 40, thereby forcing the link member 36 to push the plunger 32 downwardly in each track 28a and b to engage a pair of clips K and continue their path downwardly through the track segments 118 and 147 until the clips K engage the neck portion of the casing C. The legs of the clips K engage in the die 116 and under pressure of the plunger 32, form around the neck portion of the casing C. Thus, a pair of clips K are now secured to the neck of the casing.

As soon as the plunger has moved to its farthest downward reach, the cam will cause the cam follower 42 to retract the plunger 32 and simultaneously a camming member (not shown) will cause the link 175 to move the bell crank 172 clockwise (in FIG. 9) such as to lift the link 170 and thereby the lever 162. Since the cutting arm 146 has moved into its downward position, the bell crank 156 is now in such a position that the abutment member 160 is immediately above the abutment member 164. By way of a link 170 lifting the lever 162, the abutment 164 will lift the abutment 160 of the bell crank 156 causing the bell crank 156 to rotate counterclockwise against the tension spring 166, thereby lifting link 154 and bracket 150 causing the knife blade 148 to move through a sudden counterclockwise movement cutting through the next portion of the casing C between the clips K. The link 170 will immediately be lowered by the cam follower 176, etc., and thus the abutment 164 will be disengaged from the abutment 160, allowing the knife blade 148 and the bracket 150 to be rotated clockwise under the urging of the spring 166 between the bell crank 156 and projection 168.

As the operation is thus completed, the cams will cause the various members to return to their original position in FIG. 1 in reverse sequence.

The embodiments of the invention in which an exclusive property or privilege is claimed are defined as follows:

1. An apparatus for gathering, elongating, clipping and cutting stuffed flexible casings, including four necking plates which comprise two cooperating pairs of plates with each pair comprising a notched jaw portion mounted on each side of a casing path and adapted for opposed reciprocal movement relative the other jaw portion of the pair for engaging and gathering the said flexible casing in said plate and for necking the said casing, the said necking plates being mounted by a parallelogram linkage suspended from an overhead frame, means for simultaneously moving said necking plate pairs by means of said parallelogram linkage towards the said casing to gather the said casing within the said jaws, means to move apart the said necking plate pairs in a direction parallel to the axis of the said casing path to elongate the said gathered casing, magazine means for advancing at least one clip overhead of said casing and a reciprocating plunger for removing a clip from said magazine and arranging it on the said elongated casing between the moved-apart necking plates, die means pivoted from the said overhead frame and adapted for movement to and from a location between the said moved-apart necking plates below and adjacent the said elongated casing for receiving and forming the said clip about the said casing, cutting means adapted for movement between the said moved-apart necking plates and for cutting the said elongated casing in the vicinity of said clip, the said notched jaw portion in each necking plate comprising an open V-shaped cut-out, said parallelogram linkage including an arm for each of said necking plates, each of said necking plates being pivotally mounted to each of said arms, said arms being pivotally mounted to a pair of shafts extending parallel to the axis of the said casing path but above said path, a lever means provided in fixed relation to each of said necking plates and link means pivotally connected at one end to each of said levers and to the said frame in order to provide parallelogram movement of each of said necking plates relative to each other, said means for moving said necking plates toward the casing including a cam-operated control means linked to said mounting arms for moving the arms through reciprocating pivoting movement relative to said frame, the said shafts being journalled in said frame and being coupled for opposed rotational movement, said necking plate moving apart means including a slidable sleeve concentrically mounted on each shaft for each arm of one pair of necking plates and adapted for sliding, non-rotational movement relative to the shaft, each arm of said one pair of necking plates being mounted on each of said sleeves, means controlled by said cam operated means for sliding said arms of one pair and said respective necking plates such as to move them from the other pair of necking plates to operatively elongate the neck formed on the casing, the said die means being mounted on an arm, said arm being pivotally mounted to one of said parallel shafts, an opposed arm mounting said cutting means being pivotally mounted to the other of said shafts, each of said die support arm and cutting means arm being coupled for simultaneous pivoting movement in opposed directions and being linked to cam means for controlling the movement of said arms, said arms being so arranged on said shafts that they pass between the said necking plates when the said plates have been moved apart.

2. An apparatus as defined in claim 1, wherein a vertical track member extends above the path of the casing, including a sliding plunger member in the track, a gravity fed magazine associated with the vertical track for feeding U-shaped clips to the track, and link means associated with the plunger connecting the plunger to the cam control means for providing the reciprocating movement of the plunger towards the path of the casing.

3. An apparatus as defined in claim 2, wherein the die supporting arm and the cutting means supporting arm each includes cooperating additional track segments adapted to align themselves with said vertical track member for carrying the clip and the plunger to the neck portion of the casing in the path of the casing.

4. An apparatus as defined in claim 1, wherein the cutting means supporting arm includes a first pivot bracket, a cutting knife mounted at one end of the pivot bracket and adapted to pass through the casing path when the arm is in an operative position, a first crank arm mounting on the cutting arm and linked to the bracket by a pivoting link member, tension means associated with the crank arm and the cutting arm for normally holding the knife and bracket in a retrieved position, a lever member pivotally mounted to the frame and adapted to engage the crank arm when the knife supporting arm is in an operative position, link means connected to said lever member on said frame and said cam control means for moving the lever and engaging the crank arm to activate said knife against the urging of the tension means.

* * * * *